United States Patent
Zimmel

(10) Patent No.: US 7,269,319 B2
(45) Date of Patent: Sep. 11, 2007

(54) OUTSIDE PLANT FIBER OPTIC CABLE WITH THERMAL PROTECTION

(75) Inventor: Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 125 days.

(21) Appl. No.: 10/983,157

(22) Filed: Nov. 3, 2004

(65) Prior Publication Data

US 2006/0093268 A1    May 4, 2006

(51) Int. Cl.
*G02B 6/44* (2006.01)

(52) U.S. Cl. .................. 385/100; 385/109; 385/53; 385/76; 385/84

(58) Field of Classification Search .......... 385/100, 385/105, 106, 109, 112, 99, 76, 77, 78, 141, 385/53, 56, 66, 84, 86, 87
See application file for complete search history.

(56) References Cited

U.S. PATENT DOCUMENTS

| | | | | |
|---|---|---|---|---|
| 4,998,527 A | * | 3/1991 | Meyer | 600/104 |
| 5,386,489 A | * | 1/1995 | Stokes | 385/100 |
| 5,611,012 A | * | 3/1997 | Kuchenbecker | 385/86 |
| 5,764,839 A | * | 6/1998 | Igl et al. | 385/114 |
| 6,081,641 A | * | 6/2000 | Chen | 385/43 |
| 6,370,310 B1 | | 4/2002 | Jin et al. | 385/136 |
| 6,487,345 B1 | | 11/2002 | Dixon et al. | 385/100 |
| 6,496,625 B1 | | 12/2002 | Falkowich et al. | 385/100 |
| 6,690,866 B2 | | 2/2004 | Bonja et al. | 385/109 |
| 6,714,713 B2 | | 3/2004 | Lanier et al. | 385/128 |
| 6,801,695 B2 | | 10/2004 | Lanier et al. | 385/100 |
| 6,801,696 B2 | | 10/2004 | Davis et al. | 385/109 |

FOREIGN PATENT DOCUMENTS

WO    WO 02/052320 A1    7/2002    ............. 385/100 X

OTHER PUBLICATIONS

FOnetworks, Inc. FOnetworks 6 and 12 Fiber Ribbon Fanout assemblies: 3 pages total. no date available.
Time and Temperature Dependent Material Behavior and its Impact on Low Temperature Performance of Fiber Optic Cables, Materials Research Society Proceedings vol. 531, p. 333 (1998), 13 pages.

* cited by examiner

*Primary Examiner*—Brian M. Healy
(74) *Attorney, Agent, or Firm*—Merchant & Gould P.C.

(57) ABSTRACT

A fiber optic cable assembly with an optical fiber extending through first and second overlapping cable jackets. The first cable jacket is slidably received within a longitudinal opening of the second cable jacket. A first end of the optical fiber is fixed with respect to the first cable jacket and a second optical fiber is fixed with respect to the second cable jacket. The two cable jackets overlap and are slidably movable with respect to each other. A method forming a cable assembly.

12 Claims, 3 Drawing Sheets

US 7,269,319 B2

OUTSIDE PLANT FIBER OPTIC CABLE WITH THERMAL PROTECTION

BACKGROUND

Optical fiber cables are typically composed of a variety of longitudinal elements which are terminated and constrained longitudinally with respect to each other. These elements may include the optical fiber itself, tubular sheathing materials, linear strength members, and outer layers for sealing the other elements from environmental damage from rain or other moisture. Each of these elements may have different thermal coefficients of expansion. At temperatures near the ambient temperature present when the cable is assembled and terminated, the differences in thermal expansion of the various elements is not significant enough to cause any attenuation or insertion loss to optical signals being transmitted by the cable.

However, as these cables are exposed to temperatures more extreme with respect to the ambient temperature at the time of assembly and termination, the differing thermal expansion coefficients may become more significant. Optical fiber cables may be exposed to operating temperatures up to one hundred degrees Fahrenheit removed from the ambient temperature of assembly and termination. At these temperatures, the differing degrees of elongation or contraction among the elements of the cable may damage the fiber or may cause unacceptable amounts of attenuation or insertion loss of signals being transmitted over the cable. Improvements to known optical fiber cables to address temperature-induced stresses are desirable.

SUMMARY

The present invention relates to a fiber optic cable assembly with an optical fiber extending through first and second overlapping cable jackets. The first cable jacket is slidably received within a longitudinal opening of the second cable jacket. A first end of the optical fiber is fixed with respect to the first cable jacket and a second optical fiber is fixed with respect to the second cable jacket. The two cable jackets overlap and are slidably movable with respect to each other. The present invention further relates to a method forming a cable assembly.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
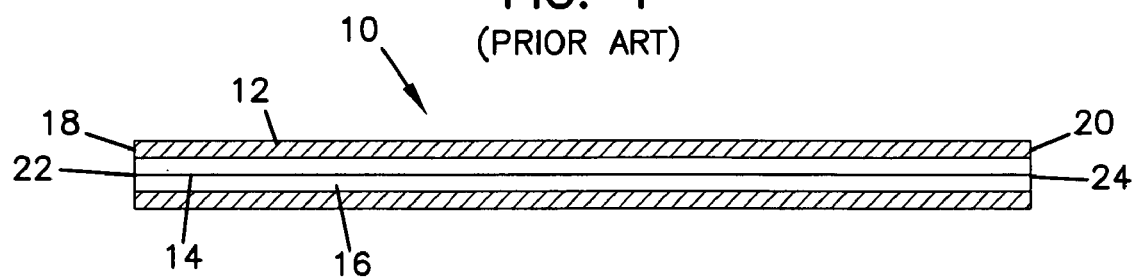
FIG. 1 is a cross-sectional view of a prior art optical fiber cable segment.
Figure 2:
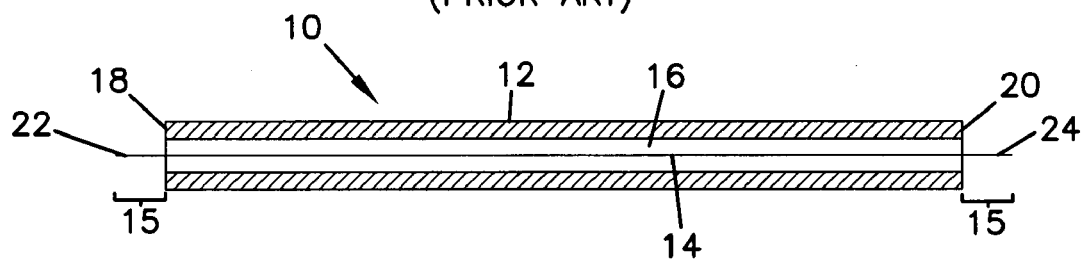
FIG. 2 is a cross-sectional view of the prior art optical fiber cable segment of FIG. 1 at a reduced ambient temperature where the ends of the fiber and the cable jacket are not constrained with respect to each other.
Figure 3:
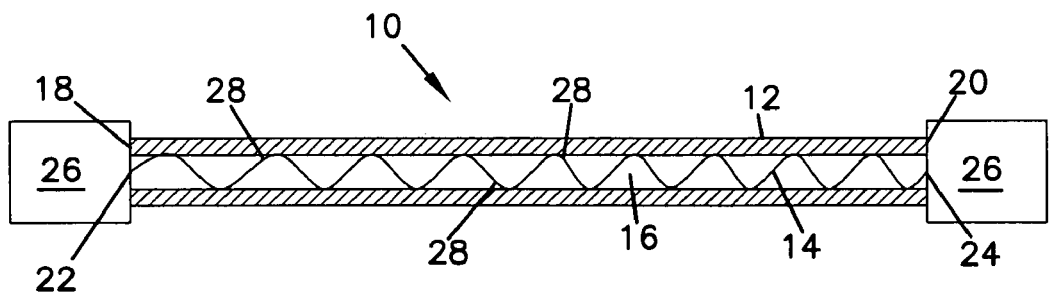
FIG. 3 is a cross-sectional view of the prior art optical fiber cable segment of FIG. 1 at a reduced temperature where the ends of the fiber and the cable jacket are constrained with respect to each other.

Optical fiber cables may be installed within telecommunications networks and exposed to the extremes of outside air temperatures. These optical fiber cables are made of a variety of materials, including but not limited to the optical fiber itself, jacketing and cladding, and strength members. Each of these constituent materials may have a different thermal coefficient of expansion, meaning that the materials will expand or contract at different rates due to temperature changes. The prior art optical fiber cables in FIGS. 1 to 3 show the effect of reduced temperature on an optical fiber cable 10 including an outer jacket 12 and an optical fiber 14. Fiber 14 is slidably held within a hollow opening 16 defined by jacket 12. Jacket 12 includes a first end 18 and an opposing second end 20 and fiber 14 includes corresponding first and second ends 22 and 24.

In FIG. 1, cable 10 is exposed to a first temperature such that the ends of fiber 14 and jacket 12 are aligned with each other. If fiber 14 and jacket 12 were originally the same length at the time of their assembly, this indicates that the first temperature is approximately equal to the ambient temperature at which cable 10 was assembled. Cable 10 may be an optical fiber drop cable where fiber 14 is freely slidable within opening 16 of jacket 14. The first ends 18 and 22 and the second ends 20 and 24 are not fixed or constrained with respect to each in cable 10.

In FIG. 2, cable 10 has now been exposed to a second temperature below the first temperature. Fiber 14 has a thermal coefficient of expansion which is relatively smaller than a thermal coefficient of expansion of jacket 12. At the second temperature, jacket 12 has contracted much more than fiber 14. Ends 22 and 24 of fiber 14 extend beyond ends 18 and 20, respectively, of jacket 12. Ends 22 and 24 of fiber 14 are unconstrained at ends 18 and 20, respectively, and are free to move beyond ends 18 and 20, as shown. Ends 22 and 24 extend beyond ends 18 and 20 to define an excess length 15 of fiber 14.

Alternatively, one of the first or second ends of fiber 14 and jacket 12 might be constrained with respect to each other provided the opposite ends are unconstrained and fiber 14 is freely movable within opening 16 of jacket 12.

In FIG. 3, cable 10 is now terminated at each of the first and second ends with an optical fiber connector 26. Such optical fiber connectors are well known in the art. To terminate cable 10 at connector 26, jacket 12 and fiber 14 are constrained with respect to each other. While optical fiber connector 26 may provide some degree of movement in compression of fiber 14, connector 26 does not permit fiber 14 to extend beyond connector 26. As shown in FIG. 3, cable 10 is exposed to the second, lower temperature and jacket 12 has contracted to the same extent shown in FIG. 2. In FIG. 3, however, ends 22 and 24 of fiber 14 are now constrained at ends 18 and 20 of jacket 12 by connectors 26. Thus, the contraction of jacket 12 compresses fiber 14 into the same length as jacket 12. Known materials suitable for making optical fiber 12 are essentially incompressible. Excess length 15 of fiber 14 is forced to fit within a shorter length of jacket 12 and is forced into a series of microbends 28 within opening 16. These microbends 28 may cause excess signal loss within cable 10. While cable 10 is shown as a single fiber cable and connectors 26 are described as fiber connectors, it is anticipated that a cable including multiple optical fibers could be substituted for cable 10 and a cable breakout at the end of such a multifiber cable could be substituted for connector 26 within the present invention.

Figure 4:
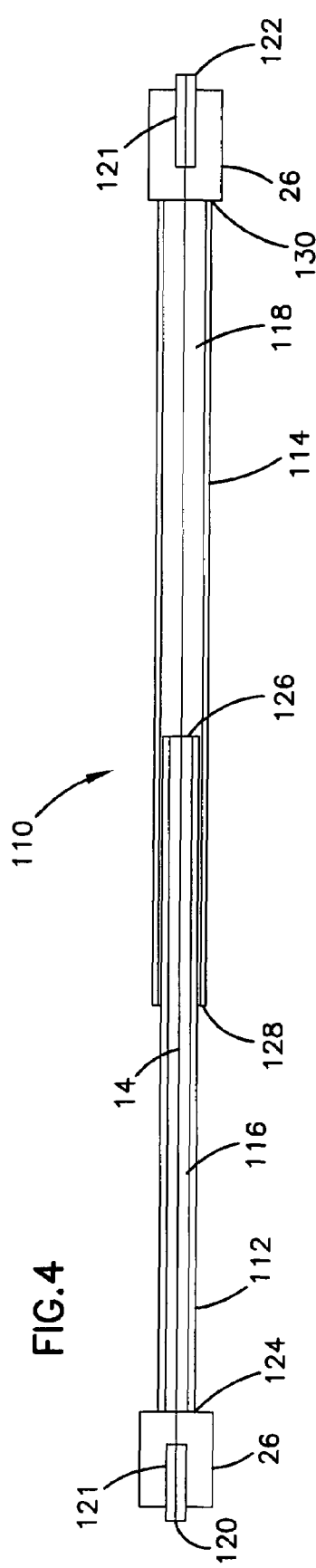
FIG. 4 is a cross-sectional view of a fiber optic cable assembly according to the present invention.

Referring now to FIG. 4, a cross-sectional view of a cable assembly 110 includes a first tubular cable jacket 112, a second tubular cable jacket 114 and optical fiber 14 extending between connectors 26. Optical fiber 14 extends within an inner longitudinal opening 116 of first jacket 112 and an inner longitudinal opening 118 of second jacket 114. A first end 120 of optical fiber 14 is terminated in a ferrule 121 of one of the connectors 26 and a second end 122 of optical fiber 14 is terminated in ferrule 121 of the other connector 26. First cable jacket 112 includes a first end 124 that is terminated at the connector 26 holding first end 120 of optical fiber 14 and an opposite second end 126. Second cable jacket 114 includes a first end 128 and a second end 130 terminated at the connector 26 holding second end 122 of optical fiber 14.

As shown in FIG. 4, first end 120 of optical fiber 14 and first cable jacket 112 are fixed with respect to each other by their common termination at one of the connectors 26. Second end 122 of optical fiber 14 and second cable jacket 114 are fixed with respect to each other by their common termination at the other connector 26. Second end 126 of first cable jacket 112 extends within opening 118 of second cable jacket 114 through first end 128 of second cable jacket 114. Opening 118 is sized to fit about first cable jacket 112 adjacent second end 126 and to permit first cable jacket 112 to freely slide within second cable jacket 114. If cable assembly 110 is exposed to different environmental conditions, differential shrinkage or expansion of either or both jackets 112 and 114 may occur, resulting in length changes of the jackets with respect to optical fiber 14. Any differential in length caused by such shrinkage or expansion is accommodated by sliding of cables jackets 112 and 114 with respect to each other, so that microbending of fiber 14 is avoided.

Figure 5:
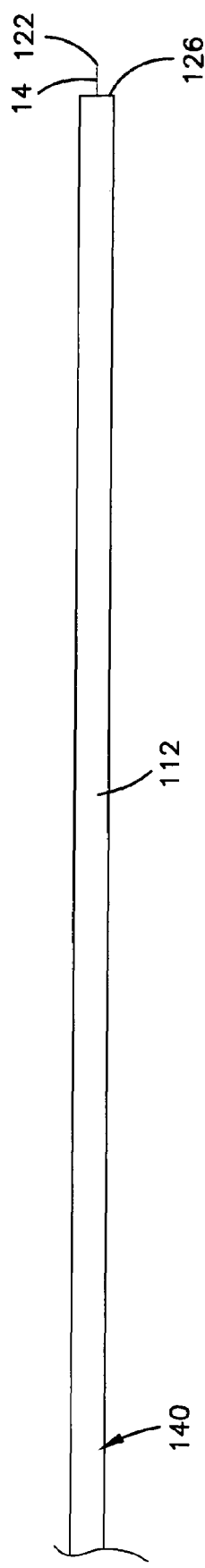
FIG. 5 is a side view of a fiber optic cable to be used in construction of a fiber optic cable assembly according to the present invention.
Figure 6:
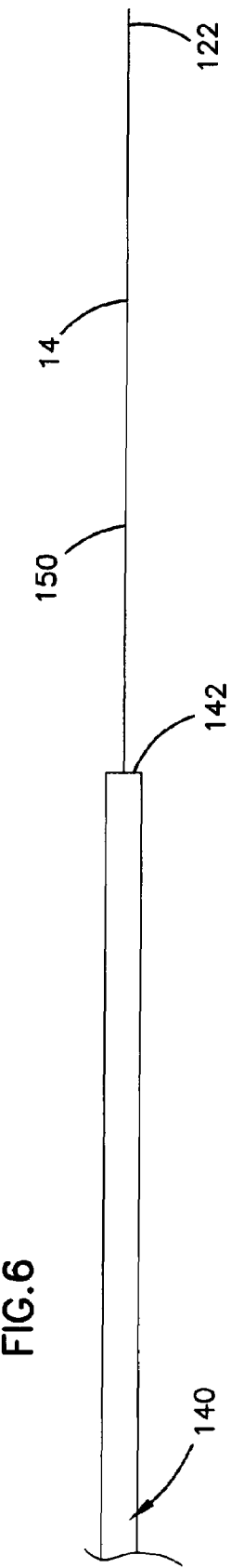
FIG. 6 is the fiber optic cable of FIG. 5, with the first cable jacket cut and a segment of the jacket removed from about the optical fiber of the cable.
Figure 7:
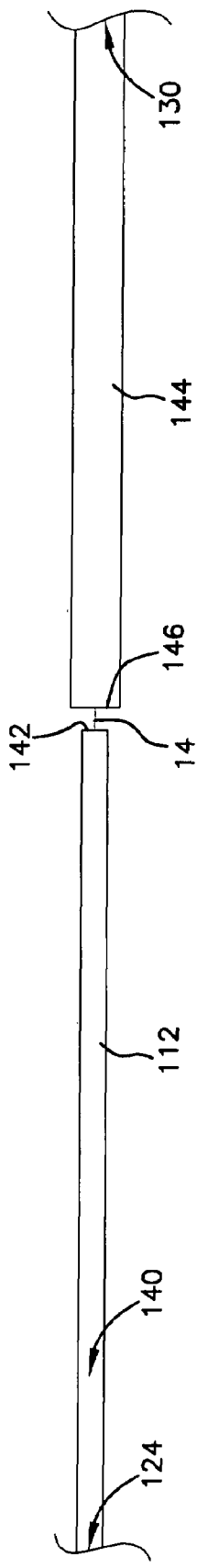
FIG. 7 is the fiber optic cable of FIG. 6, with a second cable jacket positioned about the exposed optical fiber.
Figure 8:
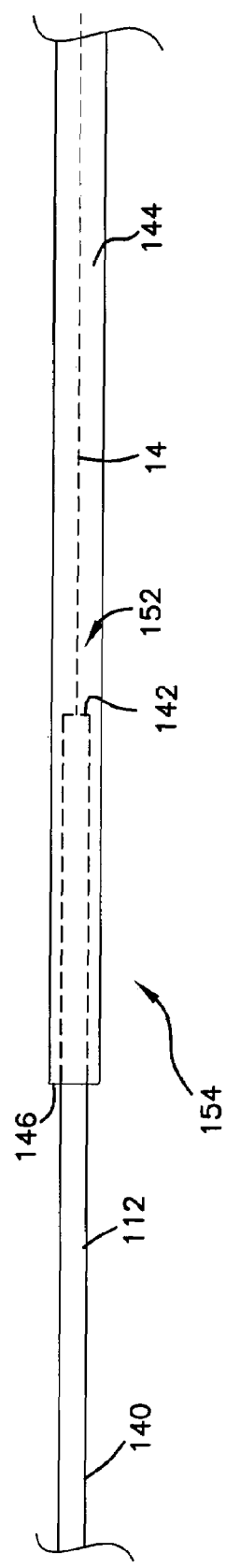
FIG. 8 is the fiber optic cable of FIG. 6, with the second cable jacket overlapping the first cable jacket to form a cable assembly in accordance with the present invention.

FIG. 5 shows an optical fiber cable 140 with first cable jacket 112 and optical fiber 14 with a second end 122 adjacent a second end 126 of jacket 112. FIG. 6 shows first cable jacket 112 cut to form a new second end 142 and the portion of jacket 112 between second end 122 and new second end 142 removed to expose a segment 150 of fiber 14 between new second end 142 and second end 122. In FIG. 7, second end 122 of fiber 14 has been extended through a first end 146 of a second tubular cable jacket 144 and first end 146 has been positioned adjacent new second end 142. Second cable jacket 144 is sized to fit about first cable jacket 112 so that first cable jacket 112 is slidably received within second cable jacket 144. This is shown in FIG. 8, where new second end 142 and a portion of first cable jacket 112 of cable 140, along with fiber 14, are shown in dashed lines within a central opening 152 of second cable segment 144. This forms a cable assembly 154.

Once cable jackets 112 and 144 are so positioned, second end 122 of fiber 14 can be terminated and fixed in position with respect to second end 130 of cable jacket 144, such as by a connector 26 as shown in the FIGS., above. Fiber 14 may also include first end 120 which is fixed with regard to first cable jacket 112, such as by terminating with a connector 26.

Figure 9:
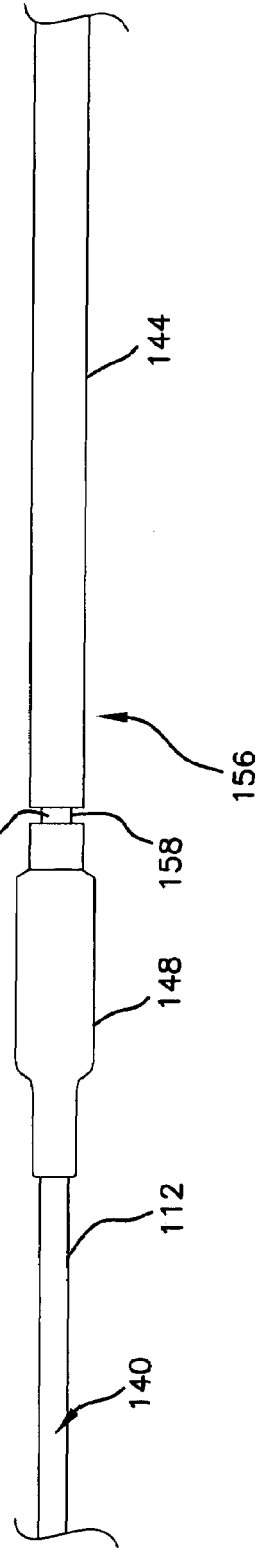
FIG. 9 is an alternative embodiment of the cable assembly of FIG. 8.

FIG. 9 shows an alternative embodiment cable assembly 156 with a boot 148 positioned about second jacket 144 adjacent first end 146 (not visible within boot 148). Boot 148 extends also about a portion of first cable jacket 112. Boot 148 may be made of a heat shrink material and placed about one of the cable jackets at a point offset from either of the ends to be overlapped. Once the cable jackets have been overlapped as shown in FIG. 8, boot 148 can be moved to the position shown in FIG. 9, and heated to shrink boot 148 tightly about both jackets. Boot 148 may provide a temporary fixed connection between the cable jackets to facilitate termination of second end 122 of fiber 14 and second end 130 of second cable jacket 144. Once this termination is completed, second cable jacket 144 can be cut at a position 158 adjacent boot 148 about first cable jacket 112. Once the cut is made at position 158, cable jackets 112 and 144 are free to move with respect to each other, as described above, to compensate for differential shrinkage or expansion.

What is claimed is:

1. A fiber optic cable assembly comprising:
   an optical fiber with a first end and a second end;
   a first jacket with a first end and a second end, and a central longitudinal opening sized to receive the optical fiber;
   a second jacket with a first end and a second end, and a central longitudinal opening sized to receive the first jacket;
   the first end of the optical fiber fixed with respect to the first jacket, the optical fiber positioned within the opening of the first jacket with a segment of the optical fiber including the second end extending beyond the second end of the first jacket;
   the segment of the optical fiber extending beyond the second end of the first jacket extending through the first end of the second jacket and positioned within the opening of the second jacket, the second end of the optical fiber fixed with respect to the second jacket;
   the second end of the first jacket extending through the first end of the second jacket and slidably received within the central opening of the second jacket, wherein the second end of the first jacket and the first end of the second jacket are free ends, wherein contraction of the first and second jackets results in sliding relative movement of the second end of the first jacket and the first end of the second jacket without contraction of the optical fiber.

2. The cable assembly of claim 1, wherein the second end of the optical fiber and the second end of the second jacket are terminated together.

3. The cable assembly of claim 2, wherein the second end of the optical fiber and the second end of the second jacket are terminated by a fiber optic connector.

4. The cable assembly of claim 1, wherein the first end of the optical fiber and the first end of the first jacket are terminated together.

5. The cable assembly of claim 4, wherein the first end of the optical fiber and the first end of the first jacket are terminated by a fiber optic connector.

6. A method of terminating an optical fiber comprising:
providing an optical fiber with a first end and a second end, a first tubular jacket with a first end and a second end, and a second tubular jacket with a first end and second end, the optical fiber extending within the first tubular jacket with the optical fiber fixed with respect to the first tubular jacket;
cutting the first tubular jacket adjacent the second end of the first jacket to create a new second end of the jacket and removing the cut portion of the first jacket from about the optical fiber so that the second end of the optical fiber and a segment of the optical fiber adjacent the second end extend beyond the new second end of the first jacket;
extending the second end of the optical fiber within the second tubular jacket through the first end of the second jacket;
extending the new second end of the first jacket within the second jacket through the first end of the second jacket; and, fixing the second end of the optical fiber with regard to the second jacket, wherein the new second end of the first jacket and the first end of the second jacket are free ends, wherein contraction of the first and second jackets results in sliding relative movement of the new second end of the first jacket and the first end of the second jacket without contraction of the optical fiber.

7. The method of claim 6, wherein the second end of the optical fiber is fixed with respect to the second jacket by terminating both the second end of the second jacket and second end of the optical fiber together.

8. The method of claim 7, wherein the second end of the second jacket and the second end of the optical fiber are terminated with a fiber optic connector.

9. The method of claim 6, wherein the first end of the optical fiber is fixed with respect to the first jacket by terminating both the first end of the first jacket and first end of the optical fiber together.

10. The method of claim 9, wherein the first end of the first jacket and the first end of the optical fiber are terminated with a fiber optic connector.

11. The method of claim 7, further comprising attaching the first end of the second jacket about the first jacket before terminating the second jacket and the second end of the optical fiber together, and cutting off the first end of the second jacket to permit the second end of first jacket to slide within the second jacket.

12. The cable assembly of claim 5, wherein the fiber optic connector is a first fiber optic connector, wherein the second end of the optical fiber and the second end of the second jacket are terminated by a second fiber optic connector, and further comprising a third jacket the same size as the second jacket positioned over the first jacket, the third jacket spaced from the second jacket at a first end of the third jacket, and a boot covering a portion of the first jacket and a second end of the third jacket.

* * * * *